United States Patent
Boss et al.

(10) Patent No.: US 10,574,751 B2
(45) Date of Patent: Feb. 25, 2020

(54) IDENTIFYING DATA FOR DEDUPLICATION IN A NETWORK STORAGE ENVIRONMENT

(71) Applicant: International Business Machines Corporation, Armonk, NY (US)

(72) Inventors: Gregory J. Boss, Saginaw, MI (US); Itzhack Goldberg, Hadera (IL); Jonathan D. Herd, Beaconsfield (GB); Neil Sondhi, Pilisborosjeno (HU)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 15/077,285

(22) Filed: Mar. 22, 2016

(65) Prior Publication Data

US 2017/0279889 A1   Sep. 28, 2017

(51) Int. Cl.
| | |
|---|---|
| *G06F 15/17* | (2006.01) |
| *H04L 29/08* | (2006.01) |
| *G06F 3/06* | (2006.01) |
| *H04L 12/26* | (2006.01) |

(52) U.S. Cl.
CPC .......... *H04L 67/1097* (2013.01); *G06F 3/067* (2013.01); *H04L 43/0882* (2013.01); *H04L 67/06* (2013.01); *H04L 67/1095* (2013.01)

(58) Field of Classification Search
CPC .... H04L 51/04; H04L 65/1069; H04L 67/148
USPC .................................................. 709/223, 226
See application file for complete search history.

(56) References Cited

U.S. PATENT DOCUMENTS

| | | |
|---|---|---|
| 5,805,536 A | 9/1998 | Gage et al. |
| 6,567,914 B1 | 5/2003 | Just et al. |
| 7,343,152 B1 | 3/2008 | Khorram |
| 8,565,310 B2 | 10/2013 | Pearlstein |
| 8,854,972 B1 * | 10/2014 | Li ........................... H04L 47/12 370/235 |
| 9,946,724 B1 * | 4/2018 | Ghosh ............... G06F 17/30156 |
| 2008/0034268 A1 * | 2/2008 | Dodd ...................... H03M 7/30 714/755 |
| 2008/0243957 A1 * | 10/2008 | Prahlad ............... G06F 11/1453 |
| 2010/0094817 A1 | 4/2010 | Ben-Shaul |
| 2010/0280711 A1 * | 11/2010 | Chen .................... B60R 16/037 701/36 |
| 2011/0271010 A1 | 11/2011 | Kenchammana et al. |

(Continued)

OTHER PUBLICATIONS

"De-Duplication and Your Backup", Code 42, Support, CrashPlan, Version 4, Last updated Dec. 17, 2015, dated Dec. 23, 2015, 1 page, <http://support.code42.com/CrashPlan/4/Backup/De-Duplication_And_Your_Backup>.

(Continued)

*Primary Examiner* — Thanh T Nguyen
(74) *Attorney, Agent, or Firm* — Isaac J. Gooshaw

(57) ABSTRACT

A computer-implemented method includes receiving, by a storage controller, a hash data. The hash data includes a hash of a remote data. The method includes comparing, by the storage controller, the hash data against an index. The index includes one or more hashes of a local data. The method includes determining, by the storage controller, whether the remote data parallels any part of the local data, based on comparing the hash data with the index. The method is responsive to the remote data paralleling any part of the local data. The method includes sending, from the storage controller, a request to not transmit said remote data.

17 Claims, 5 Drawing Sheets

(56) References Cited

U.S. PATENT DOCUMENTS

| | | | |
|---|---|---|---|
| 2012/0310890 A1* | 12/2012 | Dodd | G06F 16/113 |
| | | | 707/646 |
| 2013/0204455 A1* | 8/2013 | Chia | G07C 5/008 |
| | | | 701/1 |
| 2014/0095213 A1* | 4/2014 | Gwilliam | G06Q 40/08 |
| | | | 705/4 |
| 2014/0095439 A1 | 4/2014 | Ram | |
| 2014/0136789 A1 | 5/2014 | Madan et al. | |
| 2015/0213047 A1 | 7/2015 | Madan | |
| 2015/0261445 A1 | 9/2015 | Chatterjee | |
| 2016/0077924 A1* | 3/2016 | Todd | G06F 11/1435 |
| | | | 707/692 |
| 2016/0085751 A1* | 3/2016 | Camble | G06F 11/1453 |
| | | | 707/679 |
| 2016/0110260 A1* | 4/2016 | Chandrasekharan | |
| | | | G06F 11/1469 |
| | | | 707/652 |
| 2016/0162507 A1 | 6/2016 | Gupta | |
| 2016/0170657 A1* | 6/2016 | Suehr | G06F 3/06 |
| | | | 711/162 |
| 2017/0090786 A1* | 3/2017 | Parab | G06F 3/0619 |
| 2017/0279889 A1* | 9/2017 | Boss | H04L 67/1097 |

OTHER PUBLICATIONS

"Client-side data deduplication", IBM Tivoli Storage Manager, Version 6.4, 4 pages, dated Jan. 18, 2016, <https://www-01.ibm.com/support/knowledgecenter/SSTFZR_6.4.0/com.ibm.itsm.client.doc/c_dedup.html>.

IBM Appendix P., "List of IBM Patents or Patent Applications to be Treated as Related", Sep. 18, 2019, 2 pages.

Boss et al., "Identifying Data for Deduplication in a Network Storage Environment", U.S. Appl. No. 16/574,463, IBM Attorney Docket No. END920150332US02, filed Sep. 18, 2019, 22 pages.

\* cited by examiner

IDENTIFYING DATA FOR DEDUPLICATION IN A NETWORK STORAGE ENVIRONMENT

BACKGROUND

The present invention relates generally to the field of data storage management and more particularly to identifying data for deduplication.

Data deduplication is a data compression technique for eliminating repeated copies of the same data. Data deduplication improves storage utilization and, when applied to network data transfers, reduces the volume of data transmitted. In data deduplication, unique files (or, more generally, byte patterns), are identified and stored for analysis. This analysis may include comparing other files to the unique files and eliminating redundant files. Current data deduplication methods face difficulty with identifying redundant data files and with the amount of memory required to identify data for deduplication.

SUMMARY

A computer-implemented method includes receiving, by a storage controller, a hash data. The hash data includes a hash of a remote data. The method includes comparing, by the storage controller, the hash data against an index. The index includes one or more hashes of a local data. The method includes determining, by the storage controller, whether the remote data parallels any part of the local data, based on comparing the hash data with the index. The method is responsive to the remote data paralleling any part of the local data. The method includes sending, from the storage controller, a request to not transmit said remote data. A possible advantage of some embodiments of the computer-implemented method is that comparing hash data requires less memory and computer resources than would be required to compare local and remote data in full.

In an aspect, the computer-implemented method may further include responding to the hash data not paralleling any part of the local data, sending, from said storage controller, a request to transmit the remote data to the storage controller. A possible advantage of embodiments including the further step is that the storage controller is requesting data not already included among the local data, thereby reducing duplicates.

In an aspect, the computer-implemented method may further include responding to the hash data not paralleling any part of the local data by identifying a data size. The data size being for the remote data. The method includes identifying a bandwidth availability. The bandwidth availability is between a server and the storage controller. The method includes identifying a latency. The latency is between the server and the storage controller. The method includes identifying a transmission cost. The transmission cost is based on the data size, the bandwidth availability, and the latency. The method is responsive to the transmission cost being less than a threshold by sending from the storage controller, a request to transmit the remote data to the storage controller. The method is responsive to the transmission cost being greater than or equal to a threshold by sending, from the storage controller, a request to not transmit said remote data. A possible advantage of embodiments including the further step is that the storage controller is not requesting data if transmitting the data would be too taxing on the computer.

In another aspect, a computer-implemented method includes identifying, by a server, a local data. The method includes hashing the local data to yield a hash data. The method includes sending, to a storage controller, the hash data. The method includes receiving, from the storage controller, a responsive management request for the local data. A possible advantage for various embodiments of the computer-implemented method is that sending hash data requires less memory and computer resources than would be required to send local and remote data in full.

In an aspect, the responsive management request may be to delete the local data. The method may further include deleting the local data. A possible advantage of embodiments including this step is that the server deletes redundant local data.

In an aspect, the responsive management request may be to transmit the local data to the storage controller. The method may further include transmitting the local data to the storage controller. A possible advantage of embodiments including this step is that the server transmits non-redundant local data, such that the storage controller receives data that was not being previously stored.

DETAILED DESCRIPTION

Figure 1:
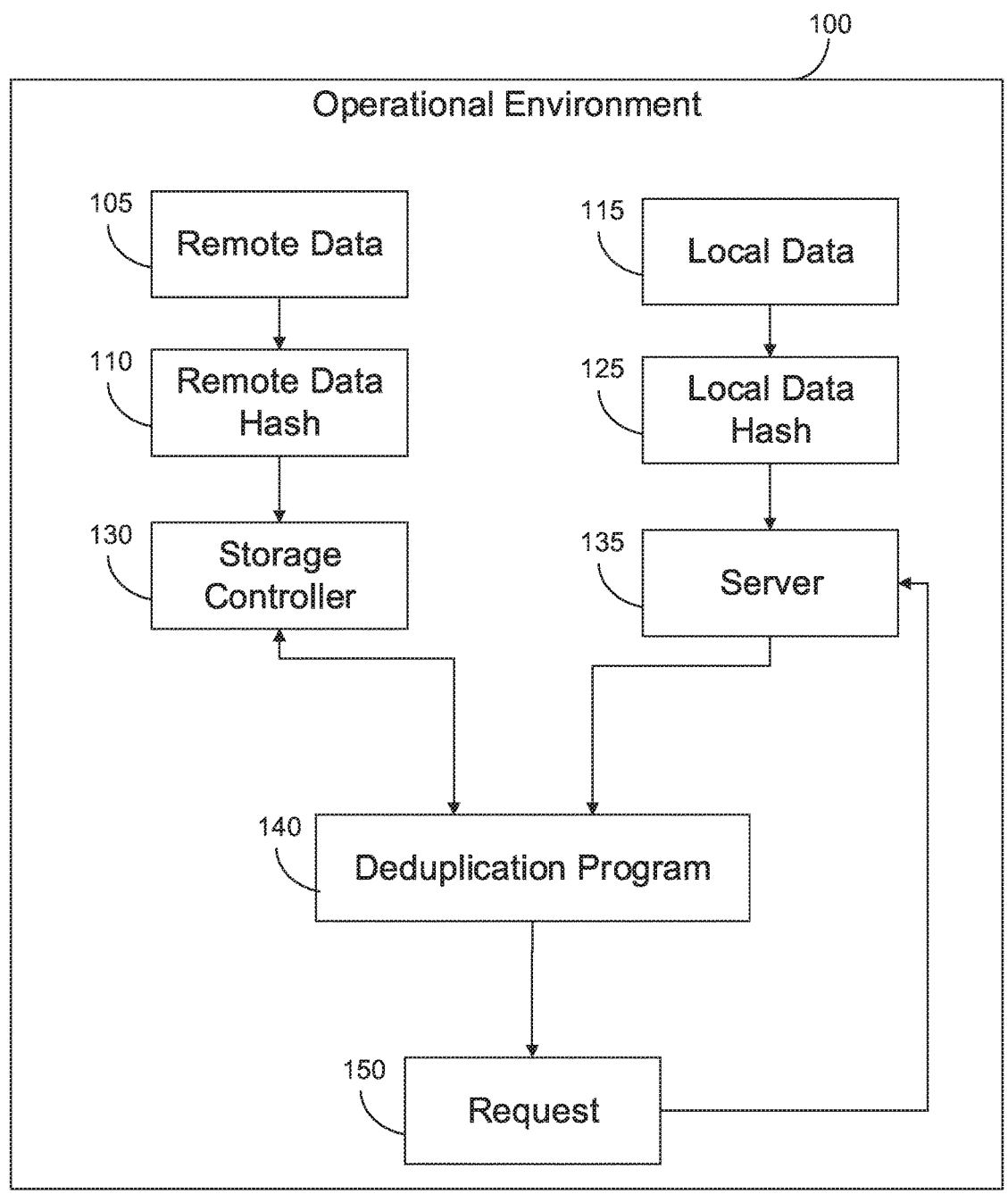
FIG. 1 is a block diagram of an operational environment suitable for operation of a deduplication program in accordance with at least one embodiment of the present invention.

Referring now to the invention in more detail, FIG. 1 is a block diagram displaying an exemplary operational environment suitable for operation of at least one embodiment of the invention. An operational environment 100 includes a remote data 105, a remote data hash 110 of the remote data 105, a storage controller 130, a local data 115, a local data hash 125 of the local data 115, a server 135, a deduplication program 140, and a request 160, all in mutual communication and interconnected via the operational environment 100. The operational environment may be a cloud-based, virtual, or distributed environment on defined server hardware, or, more generally, the operational environment 100 may be any type of environment suitable for access by the deduplication program 140.

The remote data 105 and the local data 115 may be data files, a collection of data files, an index of data files, a repository of data files, and/or a library of data files. The deduplication program 140 need not have direct access to the remote data 105. The remote data 105 is accessible to the deduplication program 140 via a network, such as the operational environment 100, or a network storage environment. The deduplication program 140 does have physical access to the local data 115.

The remote data hash 110 is a hash of the remote data 105. The local data hash 125 is a hash of the local data 115. The remote data hash 110 and the local data hash 125 are the result of a hash function being applied to the remote data 105 and the local data 115, respectively. A hash function is any function that can be used to map data of arbitrary size to data of fixed size. A hash function may utilize a hash table. In some embodiments, the server 135 hashes the local data 115 to yield the local data hash 125. In some embodiments, the deduplication program hashed the local data 115 to yield the local data hash 125.

In an embodiment, the storage controller 130 operates and manage a storage system. The storage system may include the remote data 105 and/or the remote data hash 110. The storage controller 130 may have processors embedded to perform functions related to data storage and storage management.

The server 135 is a computer program or a device that provides functionality for other programs, such as the deduplication program 140, or devices, such as the storage controller 130. The server 135 may be a database server, file server, web server, and/or application server.

The deduplication program 140 receives the remote data hash 110 via the storage controller 130, and the local data hash 125, via the server 135 as input and generates the request 160 as output. The request 160 may be a command, sequence of commands, and/or instructions capable of being understood by the storage controller 130 and the server 135. The request 160 may be sent to an index, repository, and/or library where the remote data 105 is stored.

Figure 2:
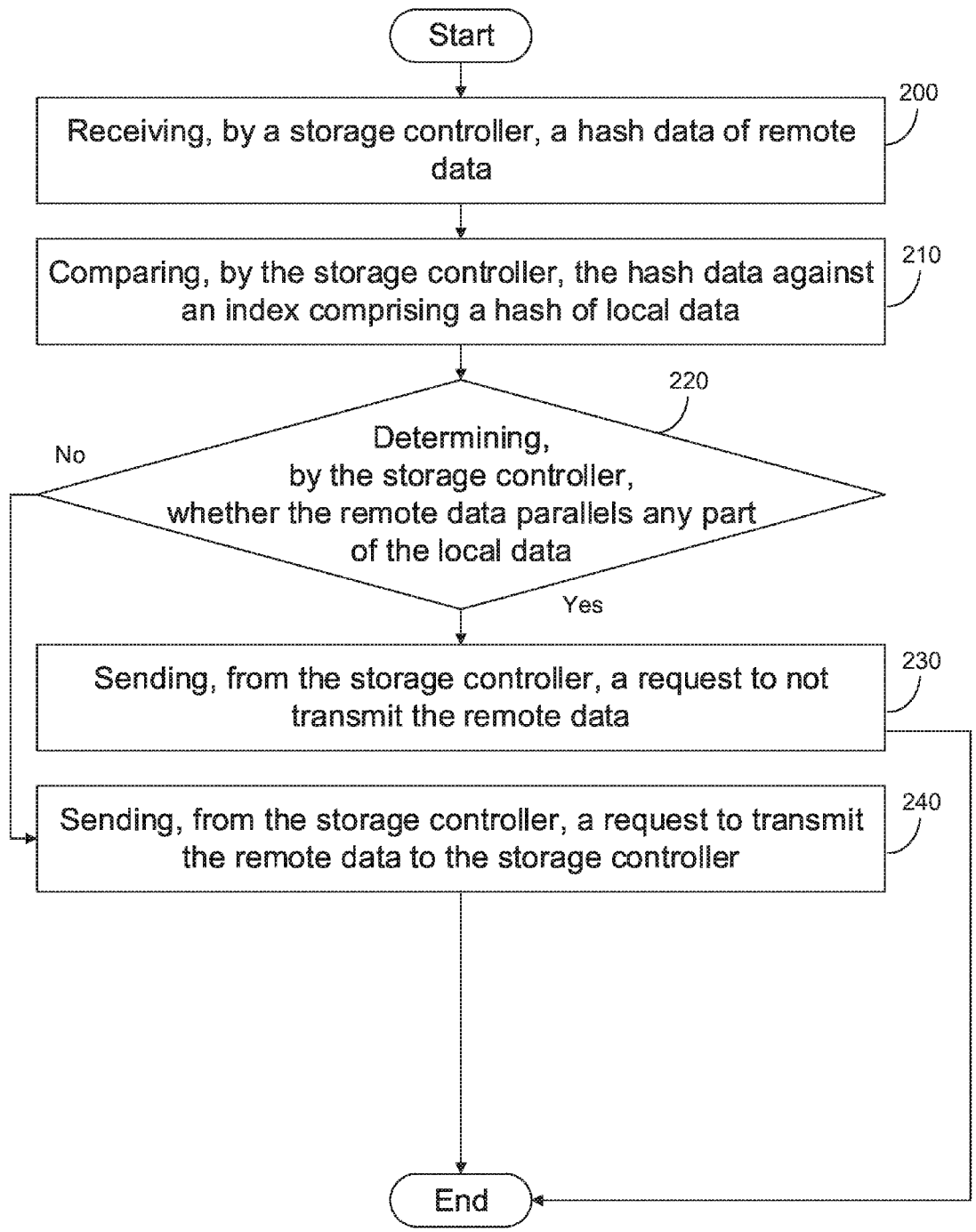
FIG. 2 is a flowchart depicting operational steps for a deduplication program, in accordance with at least one embodiment of the present invention.

FIG. 2 is a flowchart depicting the operational steps of the deduplication program 140, executing in the context of the operational environment 100 of FIG. 1, in accordance with an embodiment of the present invention.

At step 200, the deduplication program 140 receives, by the storage controller 130, the remote data hash 110. Receiving may include a user explicitly calling the deduplication program 140 from a command line interface using a reference to the remote data hash 110 as an argument. Alternatively, receiving may include automated calls to the deduplication program 140, for example, from an integrated development environment or as part of a deduplication program management system.

At step 210, the deduplication program 140 compares, by the storage controller 130, the remote data hash 110 against an index, such as the server 135. The index includes the local data hash 125. Comparing the remote data hash 110 against the index includes comparing the remote data hash 110 to the local data hash 125. Comparing may include a segment scan or an index scan.

Comparing may include the deduplication program 140 receiving a hash miss. The hash miss is an indication that the remote data hash 110, or a portion of the remote data hash 110 is unmatched when compared to the local data hash 125. In such an embodiment, the deduplication program 140 may split the unmatched hash data to yield split unmatched hash data. Splitting may including dividing the remote data hash 110 into smaller sections so the deduplication program 140 can compare the smaller sections against the local data hash 125. Splitting may be based on a predetermined size reduction, such as dividing the remote data hash 110 in half, in thirds, or in quarters. In such an embodiment, the deduplication program 140 may send the split unmatched hash data to the storage controller 130. In such an embodiment, the deduplication program 140 may estimate a splitting cost. The splitting cost may be how much memory, time, storage, and/or power is required to split the remote hash data 110 into smaller section. The splitting cost may also include how much memory, time, storage, and/or power is required to compare the split unmatched hash data to the local data hash 125. In such an embodiment, the deduplication program 140 may respond to a splitting cost threshold whereby if the estimated splitting cost is below the splitting cost threshold, the deduplication program 140 sends a request, such as the request 160. In such an embodiment the request may be to send the remote data 105 to the storage controller 130.

At step 220, the deduplication program 140 determines, by the storage controller 130 whether the remote data 105 parallels any part of the local data 115, by comparing the remote data hash 110 to the local data hash 125. The deduplication program 140 may determine that the remote data 105 parallels any part of the local data 115 by comparing strings of the remote data hash 110 to strings of the local data hash 125. The deduplication program 140 may determine that the remote data 105 parallels any part of the local data 115 if the remote data hash 110 is found included in the context of the local data hash 125.

If yes, the remote data 105 parallels any part of the local data, the deduplication program 140 proceeds to step 230. At step 230, the deduplication program 140 sends, from the storage controller 130, a request, such as the request 160, to not transmit the remote data 105. The request 160 may indicate to the storage controller 130 that the storage controller 130 should flag the remote data 105 as archived, move the remote data 105, or delete the remote data 105. The request 160 may be sent to an index, repository, and/or library where the remote data 105 is stored.

If no, the remote data 105 does not parallel any part of the local data 115, the deduplication program 140 proceeds to step 240. At step 240, the hash comparing program sends, from the storage controller 130, a request, such as the request 160, to transmit the remote data 105 to the storage controller 130. The request 160 may be sent to an index, repository, and/or library where the remote data 105 is stored.

Figure 3:
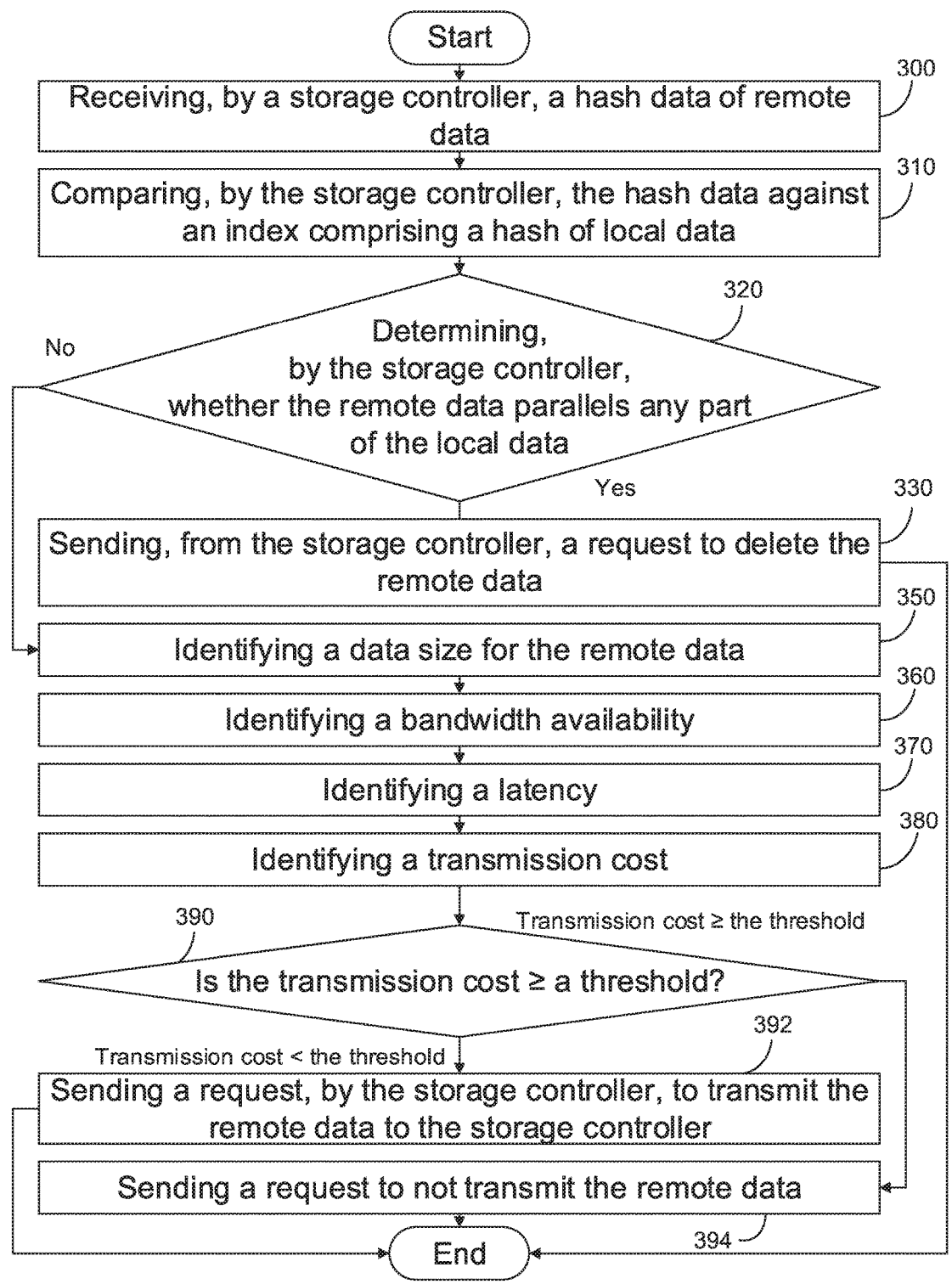
FIG. 3 is a flowchart depicting operational steps for a deduplication program with a transmission cost, in accordance with at least one embodiment of the present invention.

FIG. 3 is a flowchart depicting operational steps for a deduplication program 140 with a transmission cost, in accordance with at least one embodiment of the present invention.

The deduplication program 140 performs step 300, step 310, step 320, and step 330 in a manner similar to step 200, step 210, step 220, and step 230.

If at step 320, the deduplication program 140 determines no, the remote data 105 does not parallel any part of the local data 115, the deduplication program 140 proceeds to step 350.

At step 350, the deduplication program 140 identifies a data size for the remote data 105. Identifying may include a user explicitly calling the deduplication program 140 from a command line interface using a reference to the data size for the remote data 105 as an argument. Alternatively, receiving may include automated calls to the deduplication program 140, for example, from an integrated development environment or as part of a deduplication program management system. The data size of the remote data 105 may be a byte count for the remote data 105.

At step 360, the deduplication program 140 identifies a bandwidth availability. The bandwidth availability is between the server 135 and the storage controller 130. The bandwidth availability may be a bit-rate of available or consumed information capacity.

At step 370, the deduplication program 140 identifies a latency. The latency is between the server 135 and the storage controller 130. The latency is a time delay associated with the transmittal of data between the server 135 and the storage controller 130.

At step 380, the deduplication program 140 identifies a transmission cost. The transmission cost is based on the data size, bandwidth availability, and latency. The transmission cost may be based on a predetermined algorithm. The transmission cost may be determined dynamically via an analytics engine as each variable changes.

At step 390, the deduplication program 140 determines whether the transmission cost identified at step 380 is greater than or equal to a transmission cost threshold. The transmission cost threshold may be a predetermined threshold.

If the transmission cost is less than the threshold, the deduplication program 140 proceeds to step 392. At step 392 the deduplication program 140 sends a request, such as the request 160, by the storage controller 130, to send the remote data 105 to the storage controller 130.

If the transmission cost is greater than or equal to the threshold, the deduplication program 140 proceeds to step 394. At step 394 the deduplication program 140 sends a request, such as the request 160, by the storage controller 130, to not transmit the remote data 105.

Figure 4:
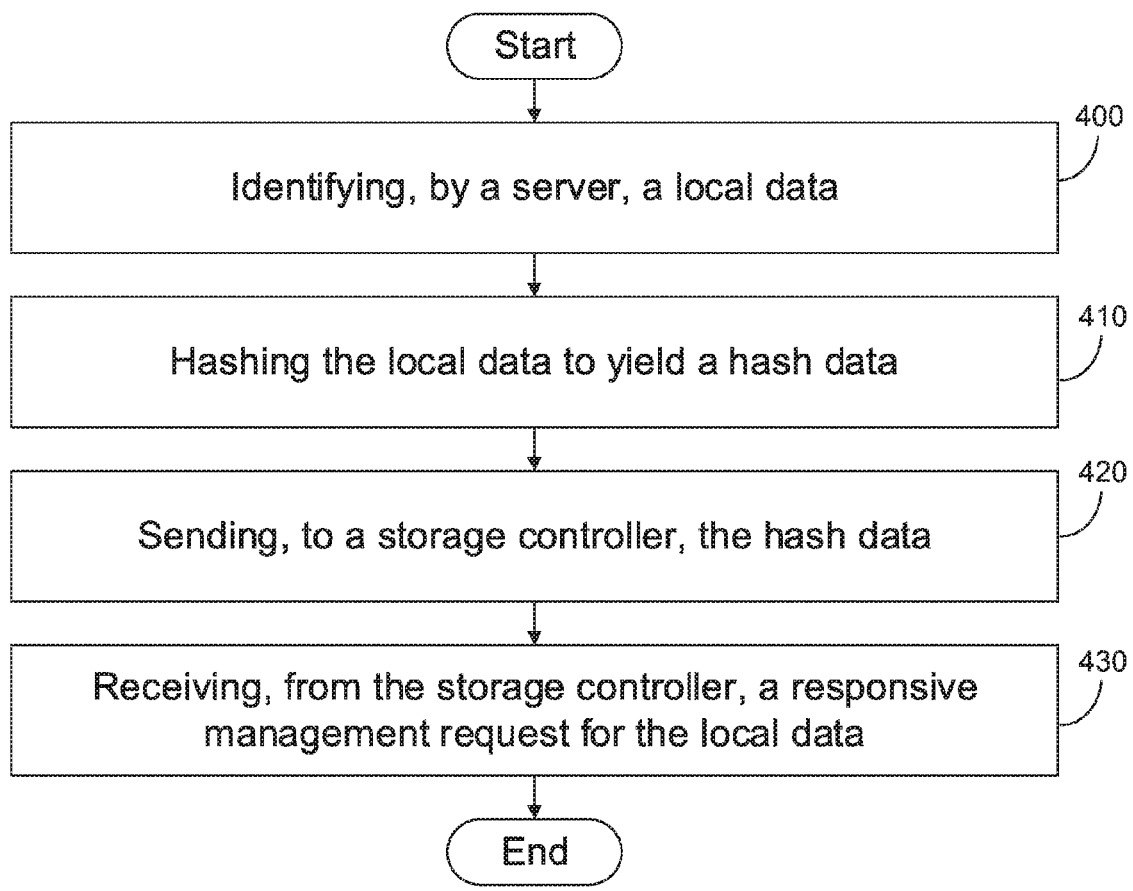
FIG. 4 is a flowchart depicting operational steps for a deduplication program, by a server, in accordance with at least one embodiment of the present invention.

FIG. 4 is a flowchart depicting operational steps for the deduplication program 140, by a server, in accordance with at least one embodiment of the present invention.

At step 400, the deduplication program 140 identifies, by a server, the local data 115. Identifying may include a user explicitly calling the deduplication program 140 from a command line interface using a reference to the local data 115 as an argument. Alternatively, receiving may include automated calls to the deduplication program 140, for example, from an integrated development environment or as part of a deduplication program management system.

At step 410, the deduplication program 140 hashes the local data 115 to yield the local data hash 125. In some embodiments the deduplication program 140 hashes the local data 115. In other embodiments, the deduplication program 140 hashes the local data 115 by the server 135.

At step 420, the deduplication program 140 sends the local data hash 125 to the storage controller 130. Sending may include transmitting, transferring, or otherwise forwarding the local data hash 125 to the storage controller 130.

At step 430, the deduplication program 140 receives, from the storage controller 130, a responsive management request, such as the request 160. The responsive management request may be a request to delete the local data 115. In such an embodiment, the deduplication program 140 may respond to the responsive management request by deleting the local data 115. The responsive management request may be a request to transmit the local data 115 to the storage controller 130. In such an embodiment, the deduplication program 140 may respond to the responsive management request by transmitting the local data 115 to the storage controller 130.

The responsive management request may be a request for the deduplication program 140 to identify a data size, a bandwidth availability between the server 135 and the storage controller 130, a latency between the server 135 and the storage controller 130. In such an embodiment, the deduplication program 140 may identify a transmission cost based on the data size, bandwidth availability, and latency. The deduplication program 140 may identify a transmission cost through a process similar to the steps of FIG. 3. The deduplication program 140 may compare the transmission cost to a threshold and respond to the transmission cost being less than the threshold by transmitting the local data 115 to the storage controller 130. The deduplication program 140 may respond to the transmission cost being greater than or equal to the threshold by deleting the local data 115.

Figure 5:
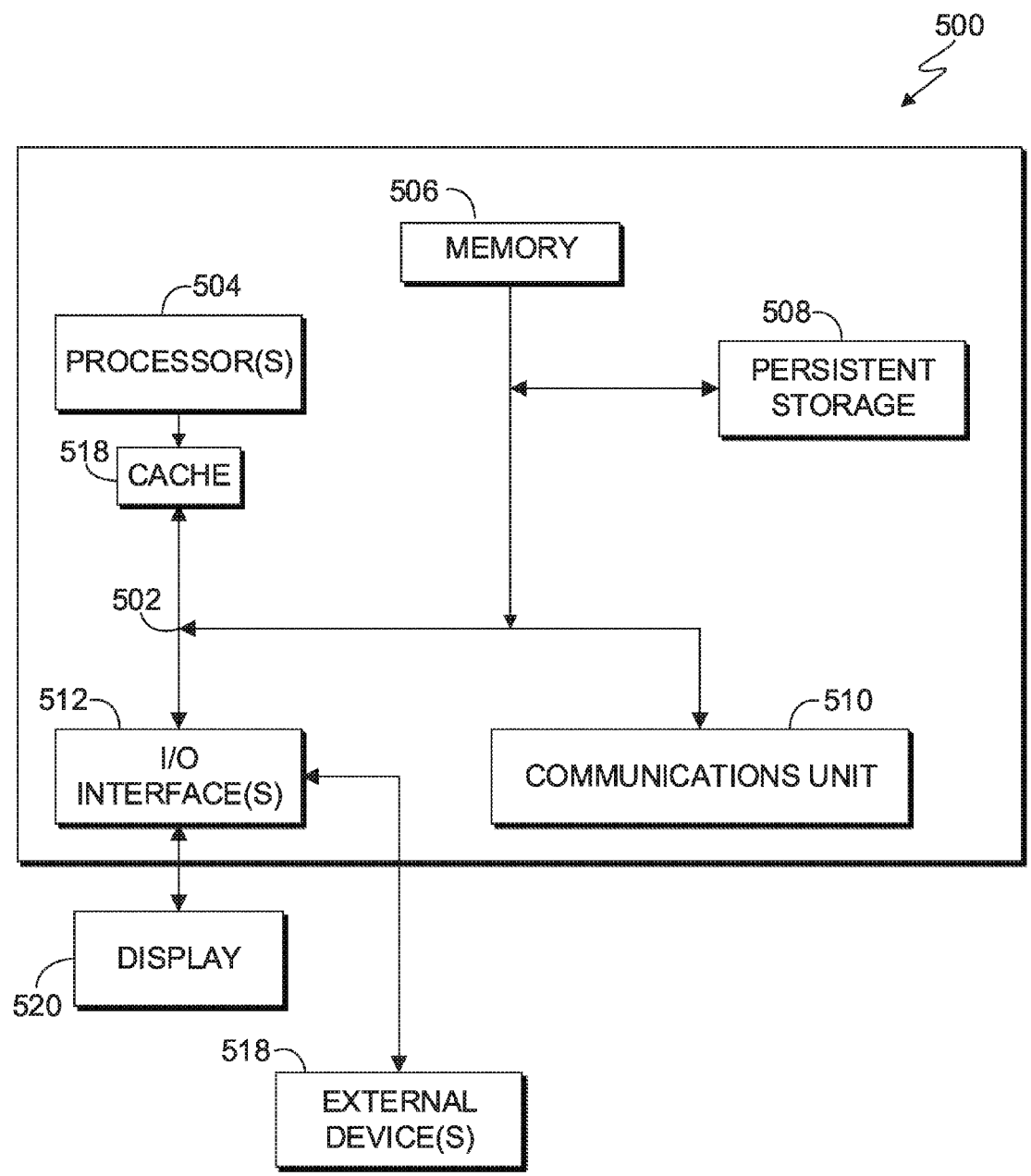
FIG. 5 is a block diagram of components of a computing apparatus suitable for executing a deduplication program, in accordance with at least one embodiment of the present invention.

FIG. 5 is a block diagram depicting components of a computer 500 suitable for executing the deduplication program 140. FIG. 5 displays the computer 500, the one or more processor(s) 504 (including one or more computer processors), the communications fabric 502, the memory 506, the RAM 516, the cache 516, the persistent storage 508, the communications unit 510, the I/O interfaces 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the processors 504 (e.g., microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media. The cache 516 is a fast memory that enhances the performance of computer processor(s) 504 by holding recently accessed data, and data near accessed data, from memory 506.

Program instructions for the deduplication program 140 may be stored in the persistent storage 508 or in memory 506, or more generally, any computer readable storage media, for execution by one or more of the respective computer processors 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links. The deduplication program 140 may be downloaded to the persistent storage 508 through the communications unit 510. In the context of some embodiments of the present invention, the source of the various input data may be physically remote to the computer 500 such that the input data may be received and the output similarly transmitted via the communications unit 510.

The I/O interface(s) 512 allows for input and output of data with other devices that may operate in conjunction with the computer 500. For example, the I/O interface 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    receiving, by a storage controller, a hash data, said hash data comprising a hash of a remote data;
    comparing, by said storage controller, said hash data against an index, said index comprising one or more hashes of a local data;
    estimating a splitting cost, said splitting cost being associated with splitting unmatched hash data;
    responsive to said splitting cost being above a threshold, sending a request to a server to send said remote data to said storage controller;
    determining, by said storage controller, whether said remote data parallels any part of said local data, based on comparing said hash data with said index; and
    responsive to said remote data paralleling any part of said local data, sending, from said storage controller, a request to not transmit said remote data.

2. The computer-implemented method of claim 1, further comprising:
    responsive to said hash data not paralleling any part of said local data, sending, from said storage controller, a request to transmit said remote data to said storage controller.

3. The computer-implemented method of claim 1 further comprising, responsive to said hash data not paralleling any part of said local data:
    identifying a data size, said data size being for said remote data;
    identifying a bandwidth availability, said bandwidth availability being between said server and said storage controller;
    identifying a latency, said latency being between said server and said storage controller;
    identifying a transmission cost, said transmission cost being based on said data size, said bandwidth availability, and said latency; and
    responsive to said transmission cost being less than a threshold, sending, from said storage controller, a request to transmit said remote data to said storage controller.

4. The computer-implemented method of claim 3, further comprising:
    responsive to said transmission cost being greater than or equal to a threshold, sending, from said storage controller, a request to not transmit said remote data.

5. The computer-implemented method of claim 1 further comprising:
    receiving, by said storage controller, a hash miss, said hash miss being for unmatched hash data, said unmatched hash data being of said hash data;
    splitting said unmatched hash data to yield split unmatched hash data; and
    sending said split unmatched hash data to said storage controller.

6. A computer-implemented method comprising:
    identifying, by a server, a local data;
    hashing said local data to yield a hash data;
    estimating a splitting cost, said splitting cost being associated with instructions to split unmatched hash data;
    responding to said splitting cost being above a threshold by sending a request to the server to send said data to a storage controller;
    sending, to said storage controller, said hash data; and
    receiving, from said storage controller, a responsive management request for said local data.

7. The computer-implemented method of claim 6, wherein said responsive management request is to delete said local data.

8. The computer-implemented method of claim 7, further comprising:
    deleting said local data.

9. The computer-implemented method of claim 6, wherein said responsive management request is to transmit said local data to said storage controller.

10. The computer-implemented method of claim 9, further comprising:
    transmitting said local data to said storage controller.

11. The computer-implemented method of claim 9, further comprising:
    identifying a data size, said data size being for said data;
    identifying a bandwidth availability, said bandwidth availability being between said server and said storage controller;
    identifying a latency, said latency being between said server and said storage controller;
    identifying a transmission cost, said transmission cost being based on said data size, said bandwidth availability, and said latency; and
    responsive to said transmission cost being less than a threshold, transmitting said local data to said storage controller.

12. The computer-implemented method of claim 11, further comprising:
    responsive to said transmission cost being greater than or equal to a threshold, deleting said local data.

13. A computer program product comprising:
    one or more computer readable storage media and program instructions stored on said one or more computer readable storage media, said program instructions comprising instructions to:
        receive, by a storage controller, a hash data, said hash data comprising a hash of a remote data;
        compare, by said storage controller, said hash data against an index, said index comprising one or more hashes of a local data;
        estimate a splitting cost, said splitting cost being associated with instructions to split said unmatched hash data;
        respond to said splitting cost being above a threshold by sending a request to a server to send said data to said storage controller;

determine, by said storage controller, whether said remote data parallels any part of said local data, based on comparing said hash data with said index; and responsive to said remote data paralleling any part of said local data, send, from said storage controller, a request to not transmit said remote data.

14. The computer program product of claim 13, further comprising instructions to:

responsive to said hash data not paralleling any part of said local data, send, from said storage controller, a request to transmit said remote data to said storage controller.

15. The computer program product of claim 13, further comprising instructions to:

responsive to said hash data not paralleling any part of said local data, identify a hash data size, said hash block size being for said hash data;

responsive to said hash data not paralleling any part of said local data, identify a data size, said data size being for said remote data;

responsive to said hash data not paralleling any part of said local data, identify a bandwidth availability, said bandwidth availability being between said server and said storage controller;

responsive to said hash data not paralleling any part of said local data, identify a latency, said latency being between said server and said storage controller;

responsive to said hash data not paralleling any part of said local data, identify a hash data cost, said cost being based on said hash data size, said bandwidth availability, and said latency;

responsive to said hash data not paralleling any part of said local data, identify a data cost, said data cost being based on said data size, said bandwidth availability, and said latency;

compare said data cost to said hash data cost to yield a cost difference; and responsive to said cost difference being less than a threshold, send a request to said server to send said data to said storage controller.

16. The computer program product of claim 15, further comprising instructions to:

responsive to said cost difference being greater than or equal to a threshold, send a request to said server to not transmit said remote data.

17. The computer program product of claim 13, further comprising instructions to:

receive, by said storage controller, a hash miss, said hash being for unmatched hash data, said unmatched hash data being of said hash data;

split said unmatched hash data to yield split unmatched hash data; and send said split unmatched hash data.

* * * * *